United States Patent [19]

Chau-Lee et al.

[11] Patent Number: 5,265,256
[45] Date of Patent: Nov. 23, 1993

[54] DATA PROCESSING SYSTEM HAVING A PROGRAMMABLE MODE FOR SELECTING OPERATION AT ONE OF A PLURALITY OF POWER SUPPLY POTENTIALS

[75] Inventors: Kin K. Chau-Lee; Phil P. D. Hoang, both of Austin, Tex.

[73] Assignee: Motorola, Inc., Schaumburg, Ill.

[21] Appl. No.: 724,260

[22] Filed: Jul. 1, 1991

[51] Int. Cl.[5] ............................................. G06F 1/32
[52] U.S. Cl. ........................... 395/750; 364/DIG. 1; 364/232.9; 364/244.9; 364/273.1
[58] Field of Search ......................... 395/750; 364/707

[56] References Cited

U.S. PATENT DOCUMENTS

| | | | |
|---|---|---|---|
| 4,365,290 | 12/1982 | Nelms et al. | 395/750 |
| 4,590,553 | 5/1986 | Noda | 395/750 |
| 4,754,167 | 6/1988 | Conkle et al. | 365/104 |
| 5,025,387 | 6/1991 | Frane | 395/750 |

Primary Examiner—Debra A. Chun
Attorney, Agent, or Firm—Paul J. Polansky

[57] ABSTRACT

A data processing system (10) has programmable normal and low voltage modes of operation. The normal voltage mode of operation enables precharge transistors (32, 34) to couple a voltage of $(V_{DD}-V_{tn})$ to each of a plurality of precharge circuit nodes, such as precharge bus (30), within data processing system (10). During the low voltage mode of operation, the full $V_{DD}$ is coupled to each precharge circuit node, wherein the power supply voltage during the low voltage mode of operation is reduced. Data processing system (10) has a voltage mode bit (36) for receiving voltage mode information from a source external to data processing system (10). In response to an active logic state within voltage mode bit (36), a low voltage mode clocking circuit (42) is enabled.

12 Claims, 4 Drawing Sheets

DATA PROCESSING SYSTEM HAVING A PROGRAMMABLE MODE FOR SELECTING OPERATION AT ONE OF A PLURALITY OF POWER SUPPLY POTENTIALS

FIELD OF THE INVENTION

This invention relates generally to data processing systems, and more particularly, to power consumption issues of a data processing system.

BACKGROUND OF THE INVENTION

Power consumption, "P", of a data processing system is commonly calculated in terms of a power supply voltage such as $P = CV^2 f$, where "P" is power in watts, "C" is capacitance in farads, "V" is a power supply voltage in volts, and "f" is frequency of operation in hertz. For example, if the data processing system operated with a nominal five volt power supply and internally switched 10 pico-farads at a rate of one megahertz, the power consumption would be: $P = (10^{-12})(5^2)(10^6) = 25 \times 10^{-6}$ watts, or 25 microwatts. Since the power is proportional to the square of the voltage, a substantial reduction in power is achieved by simply reducing the power supply voltage.

A known method of reducing power within a data processing system that operates at a standard power supply voltage of five volts is through the use of a precharge circuit which couples a predetermined portion of the power supply voltage to a precharge circuit node. For example, when an N-channel MOS transistor has a control electrode voltage of five volts and a drain electrode voltage of five volts, a source electrode thereof will be at a potential of five volts minus an N-channel threshold voltage ($V_{tn}$). For example, if the $V_{tn}$ is one volt, the source electrode voltage would be four volts. Using the above power formula and parameters with a reduced power supply voltage of four volts, the power is calculated to be 16 micro-watts. Therefore, a 20% reduction in internal operating power supply voltage yields a 36% decrease in power consumption. An additional advantage to reducing the voltage on precharge circuit nodes within the data processing system is an increase in potential operating speed. A reason why the potential operating speed of the data processing system is increased is that the precharge voltage level is typically closer to a switch point of logic circuits connected to the precharge circuit node, where a switch point is defined as a necessary input voltage of a circuit to cause an output of the circuit to switch. If we assume that a typical switch point for circuits within a data processing system connected to a precharge circuit node is at one-half the power supply voltage of five volts, and that $V_{tn}$ is one volt, the precharge voltage level is therefore 1.5 volts above the switch point of logic circuits whose inputs are connected to the precharge circuit node. In contrast, if the precharge voltage level on the precharge circuit node were at the power supply voltage of five volts, the voltage difference between the precharge voltage level and the switch point would be 2.5 volts. It is known that when using a transistor to precharge a node that provides a voltage level close to the switch point of logic circuits connected to the precharge circuit node, the data processing system has the potential of operating faster. Further, the voltage difference between the precharge voltage level and the switch point of the circuit is termed "noise margin." For safest possible circuit operating conditions within the data processing system it is desired to have a maximum possible noise margin. However, in the design of data processing systems it is common to balance noise margin safety with increases in circuit speed performance. A known problem with utilizing transistors that have a $V_{tn}$ of one volt for precharging nodes is that if a further reduction in power consumption is desired by reducing the operating power supply voltage of the data processing system, the noise margin is substantially reduced. For example, if the operating power supply voltage were decreased to three volts, and the switch point of the circuits remained at one-half the power supply voltage, i.e. one and one-half volts, the difference between the precharge voltage, $V_{dd} - V_{tn}$, and the switch point voltage would only be one-half volt. It is important to note that the threshold voltage of MOS transistors are determined during a manufacturing process, and variances in threshold voltages are common during processing. Therefore, a small noise margin value, such as the one-half volt, is generally not considered adequate.

It is therefore desired to have a data processing system manufactured in a known predetermined process with transistors having a $V_{tn}$ such that speed performance is achieved when utilizing precharge circuits, and yet will still operate with adequate noise margins with a minimum valued power supply voltage.

SUMMARY OF THE INVENTION

The previously mentioned needs are fulfilled with the present invention. there is provided a data processing system having a programmable mode for selecting operation at one of a plurality of power supply potentials, comprising first and second control portions and a pair of transistor switches. The first control portion receives control information from a source external to the data processing system. The first control portion stores the control information as a memory storage bit, and provides an output at a logic state corresponding to the memory storage bit. The second control portion is coupled to the first control portion, receives the output of the first control portion, and provides first and second selectively activated control signals in response thereto. The pair of transistor switches is coupled to the second control portion. Each transistor switch is coupled to a precharge voltage node in the data processing system and has a control electrode for receiving a corresponding one of the selectively activated control signals. A first transistor of the pair of transistor switches establishes a first predetermined portion of a power supply voltage at the precharge voltage node in response to the first selectively activated control signal. A second transistor of the pair of transistor switches establishes a second predetermined portion of the power supply voltage at the precharge voltage node in response to the second selectively activated control signal.

In another form, there is provided method of operating a data processing system at different power supply potentials. A mode bit is received and stored. A precharge node is precharged to a first predetermined potential during a precharge period in response to the mode bit being in a first predetermined state. The first predetermined potential is substantially equal to a voltage at a first power supply voltage terminal. The precharge node is precharged to a second predetermined potential during the precharge period in response to the mode bit being in a second predetermined state. The second predetermined potential is substantially equal to the voltage at the first power supply voltage terminal minus a predetermined voltage.

These and other features, and advantages, will be more clearly understood from the following detailed description taken in conjunction with the accompanying drawings.

DESCRIPTION OF A PREFERRED EMBODIMENT

Figure 1:
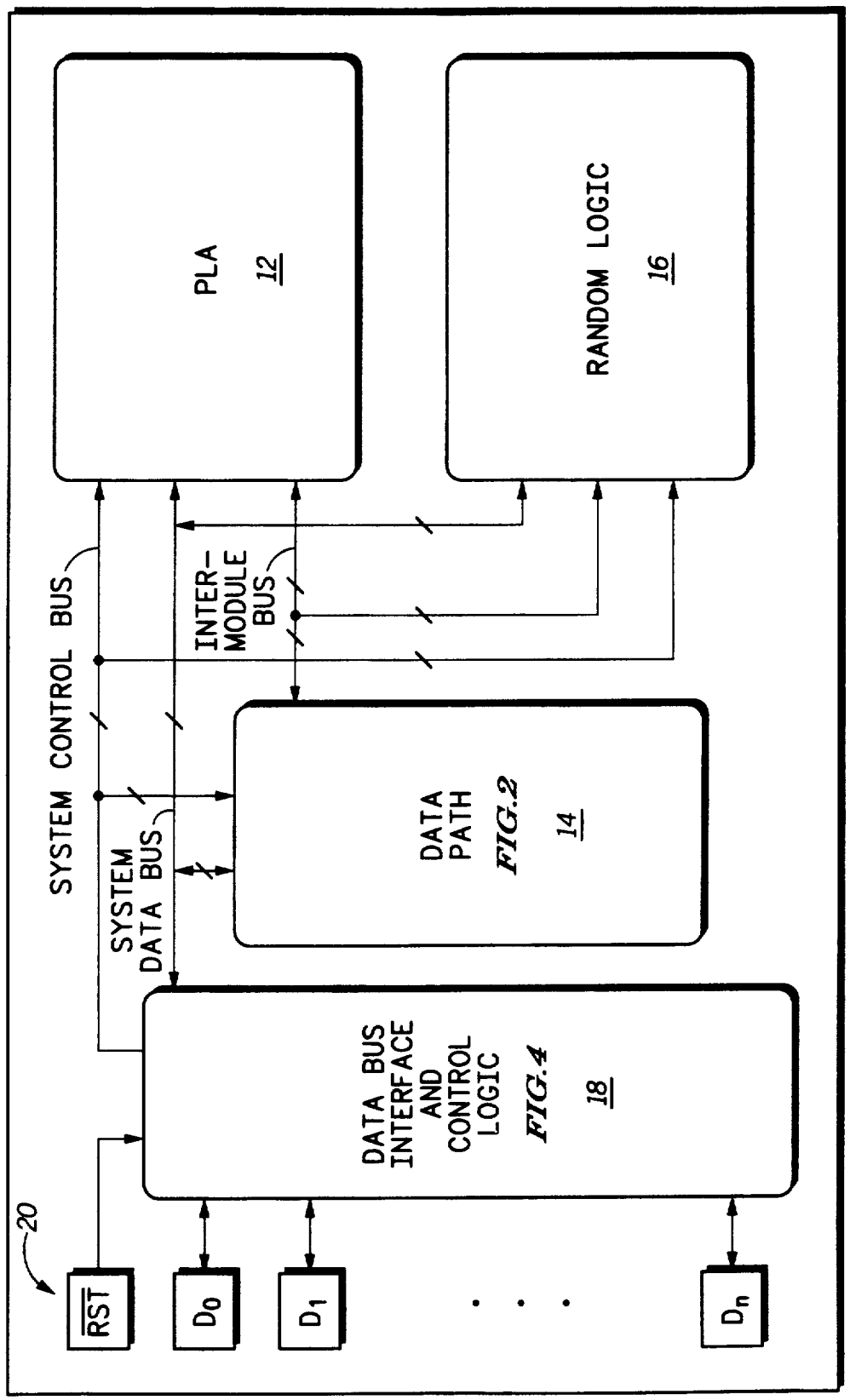
FIG. 1 illustrates in block diagram form a data processing system which utilizes the present invention.

Illustrated in FIG. 1 is an example of a data processing system 10 containing a programmable logic array 12 (PLA), a data path 14, a random logic 16, a data bus interface and control logic 18, and a plurality of data pads portion 20 in accordance with the present invention. The data bus interface and control logic 18 is connected to each of the data pads within the data pads portion 20 via dedicated control wires (not labeled). The data bus interface and control logic 18 has a control output labeled "SYSTEM CONTROL BUS" which is connected to a control input of the PLA 12, the data path 14, and the random logic 16. Further, the data bus interface and control logic 18 has an input/output (I/O) connected to an I/O of each of PLA 12, data path 14, and random logic 16 via a bus labeled "SYSTEM DATA BUS". Data path 14 is connected to both PLA 12 and random logic 16 via a bi-directional bus labeled "INTERMODULE BUS".

Figure 2:
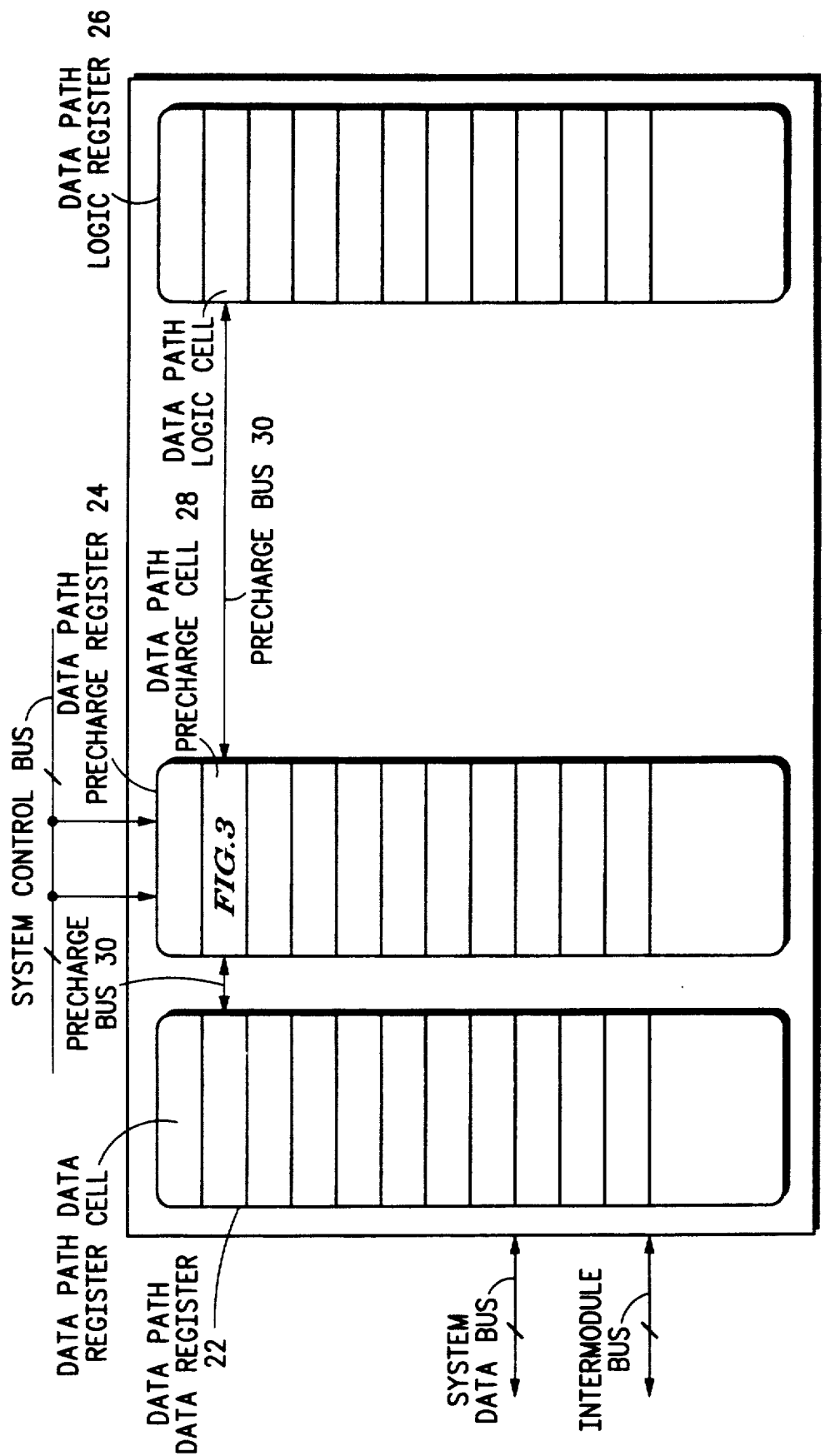
FIG. 2 illustrates in block diagram form a portion of a data path illustrated in FIG. 1.

FIG. 2 illustrates a portion of data path 14 of FIG. 1 which contains a plurality of registers, such as a data path data register 22, a data path precharge register 24, and a data path logic register 26. Each register contains a plurality of cells, such as data path precharge cell 28. Each cell within each register is connected to predetermined other cells within other registers via dedicated busses. For example, precharge bus 30 connects a predetermined data path data register cell within data path register 22 with both data path precharge cell 28 and a predetermined data path logic cell within data path logic register 26. For clarity of illustration, only precharge bus 30 is drawn.

Figure 3:
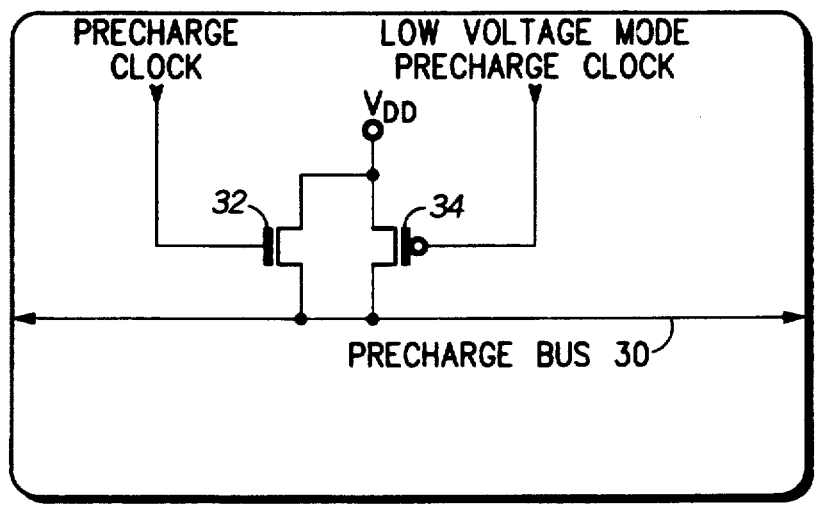
FIG. 3 illustrates in schematic form a data path precharge cell in accordance with the present invention.

FIG. 3 illustrates data path precharge cell 28 of FIG. 1 in more detail. Data path precharge cell 28 has an N-channel MOS transistor switch 32 with a gate or control electrode connected to a signal labeled "PRECHARGE CLOCK", a drain connected to a positive power supply labeled "$V_{DD}$," and a source connected to precharge bus 30. The precharge clock signal is a typical clocking signal with a predetermined frequency of operation. The data path precharge cell has a P-channel transistor switch 34 with a gate connected to a signal labeled "LOW VOLTAGE MODE PRECHARGE CLOCK", a source connected to $V_{DD}$, and a drain connected to precharge bus 30. Although specific N-channel and P-channel MOS transistors are discussed, it should be well understood that the present invention may be implemented with other types of transistors and transistors having other conductivities.

Figure 4:
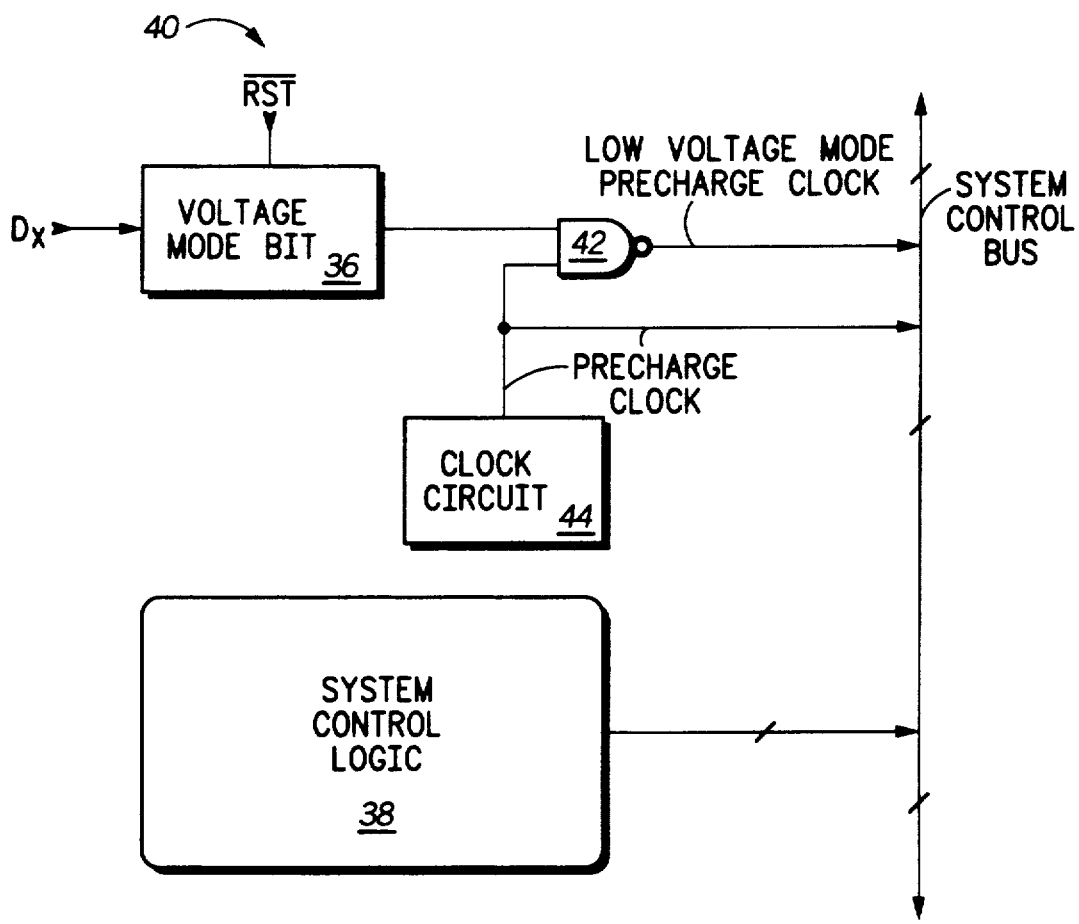
FIG. 4 illustrates in partial block diagram form a portion of a data bus interface and control logic of FIG. 1.

FIG. 4 illustrates a portion of data bus interface and control logic 18 of FIG. 1 which has a voltage mode bit 36, a system control logic 38, and a clock portion 40. The clock portion 40 has a logical NAND gate 42 and a clock circuit 44. The voltage mode bit 36 has a data input connected to a predetermined one of the data pads within data pads portion 20 labeled "DX," and a control input connected to a predetermined data pad labeled "$\overline{RST}$." NAND gate 42 has a control input connected to an output of the voltage mode bit 36, a clock input connected to an output of the clock circuit 44 labeled "PRECHARGE CLOCK," and an output for providing "LOW VOLTAGE MODE PRECHARGE CLOCK."

In operation, data processing system 10 receives instruction information via the data pads portion 20 for executing data processing commands. The data bus interface and control logic 18 latches the instruction information and selectively distributes the instruction information throughout data processing system 10 via both the SYSTEM DATA BUS and the SYSTEM CONTROL BUS. In response to the provided instruction information, PLA 12, data path 14, and random logic 16 collectively execute data processing instructions. Data processing system 10 has an additional feature which allows the data processing system 10 to operate in an alternate mode of operation, called a "low voltage mode of operation," to reduce power consumption. The low voltage mode of operation is entered in response to control information, which is provided by a source external to data processing system 10, at predetermined data pads within data pads portion 20 upon exiting a reset condition. That is, a latch (not illustrated) within the voltage mode bit 36 of FIG. 4 latches the logic state of the data pad DX when $\overline{RST}$ is deactivated. In response to the predetermined logic state of the DX pad, data processing system 10 is operating in either the low voltage mode of operation or a normal voltage mode of operation. For example, assume that a logic value of one on data pad DX produces a logic value of one at the output of the voltage mode bit 36 when $\overline{RST}$ is deactivated. The logic value of one at the output of voltage mode bit 36 enables NAND gate 42. In response, NAND gate 42 produces an output which is a logical inversion of the PRECHARGE CLOCK signal provided by clock circuit 44. When the voltage mode bit 36 latches a logic value of zero when $\overline{RST}$ is deactivated, the output of NAND gate 42 is disabled and remains at a high voltage level independent of the logic state of the precharge clock signal.

During the normal voltage mode of operation, the voltage supplied to data processing system 10 from a source external to data processing system is five volts, and when data processing system 10 is in the low voltage mode of operation, the supplied operating voltage from the external source is reduced to three volts. Using the power formula previously discussed, $P = CV^2f$, a power reduction of approximately 64% is achieved throughout data processing system 10, when the power supply voltage is reduced from five to three volts.

Figure 5:
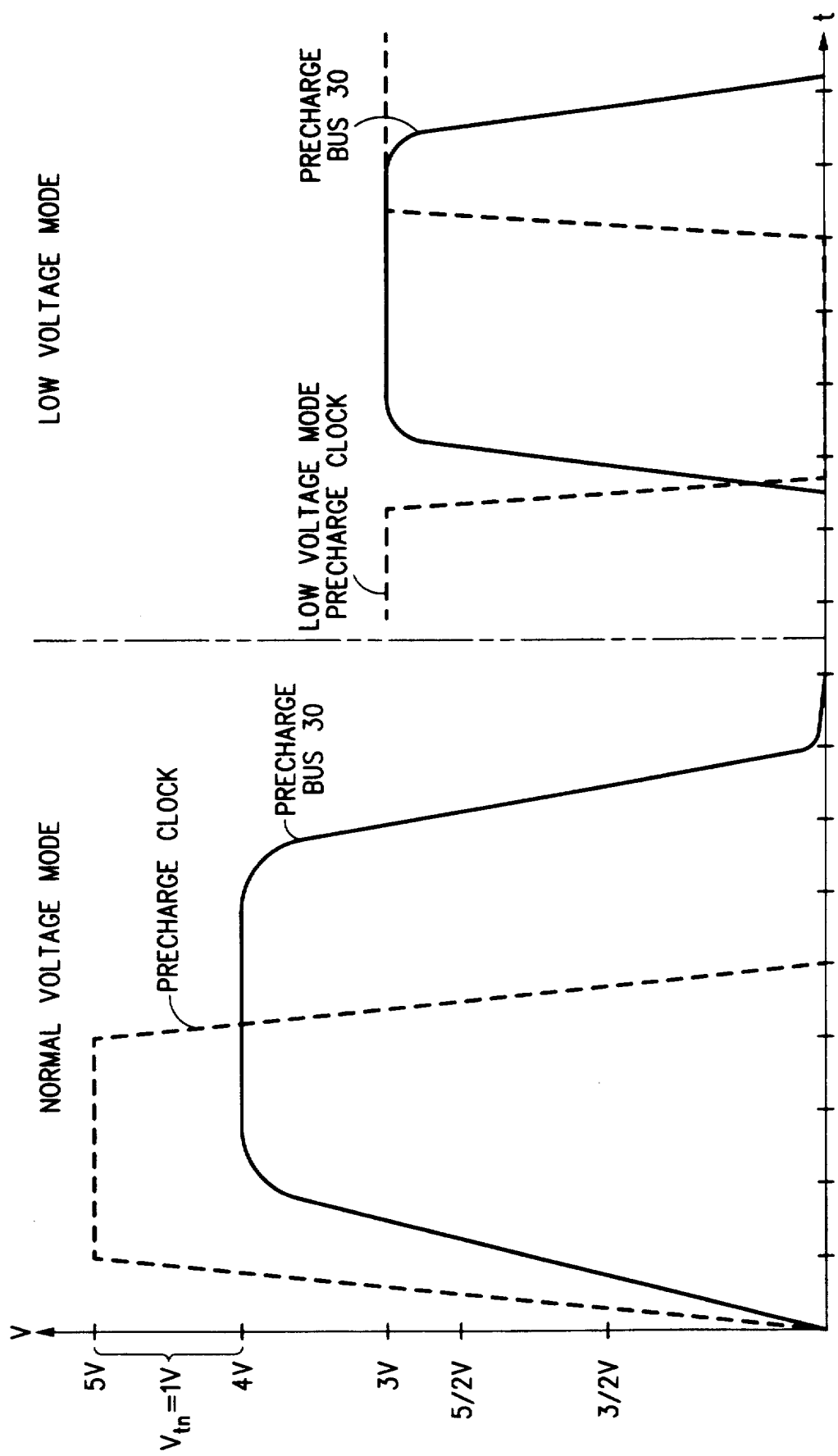
FIG. 5 illustrates in voltage waveform form a voltage waveform to illustrate the present invention.

Illustrated in FIG. 5 are typical voltage waveforms for the PRECHARGE CLOCK SIGNAL, the LOW VOLTAGE MODE PRECHARGE CLOCK signal, and the precharge bus 30. FIG. 5 illustrates that when data processing system 10 is in the normal voltage mode of operation, precharge bus 30 is coupled to a threshold voltage of an N-channel transistor below the power supply voltage in response to an active precharge clock signal. With a $V_{tn}$ of one volt, as demonstrated in FIG. 5, the voltage on precharge bus 30 reaches four volts. By reducing the voltage swing on precharge bus 30 to four volts, a power savings of approximately 36% is realized in data processing system 10. Further, since the voltage level on precharge bus 30 is typically closer to a switch point of logic gates (not illustrated), within data path 14, which are coupled to precharge bus 30, an increase in speed performance is realized.

An increase in power savings of data processing system 10 is achieved by further reducing the voltage swing of each circuit node within data processing system 10. For example, if the voltage swing on precharge bus 30 of FIG. 2 were reduced from five volts to three volts, a 64% power savings is realized within data path 14. Reducing the voltage swing of each circuit node within data processing system 10 is accomplished by reducing the power supply voltage. However a known problem with reducing the power supply voltage without modifying the threshold voltage of the N-channel precharge transistors within data processing system 10, is that the noise margin of logic circuits coupled to each of the N-channel precharge circuit nodes is significantly reduced. For example, if the power supply voltage is reduced to three volts, the $V_{tn}$ remained at one volt, and circuits coupled to the precharge circuit node have a switch point of norminally one-half the power supply voltage, the noise margin of logic circuits (not illustrated), within data processing system 10 which are coupled to each N-channel precharge circuit node would be $V_{dd}-V_{tn}-0.5V_{dd}=0.5$ volt. Further, variations in process manufacturing could further reduce the noise margin.

FIG. 5 further demonstrates a low voltage mode precharge voltage waveform. That is, during the low voltage mode of operation of data processing system 10, the precharge voltage level on each precharge circuit node is equal to the reduced power supply voltage of three volts. Since each precharge circuit node within the data processing system 10 has the full $V_{DD}$ voltage, the noise margin of logic circuits coupled to the precharge circuit node is increased to an acceptable level. Using the above example but changing the precharge voltage level, the noise margin is now $V_{DD}-0.5V_{DD}=1.5$ volt.

A potential disadvantage of reducing the power supply voltage of data processing system 10 to three volts to save power, is that data processing system 10 will typically operate slower. That is, since the voltages that control the operation of each of the transistors within data processing system 10 is reduced, the gain of each said transistor is reduced, where gain is defined as a drain current, $i_d$, in terms of a gate, a source, and a drain voltage. Therefore, an inherent tradeoff exists between reducing the power supply voltage to save power within data processing system 10, and speed performance.

As mentioned previously, the programmable low power mode of operation of the present invention is accomplished by latching a predetermined logic state in the voltage mode bit 36 when $\overline{RST}$ is deactivated. For the illustrated example in FIG. 4, the predetermined logic state to enable the low power mode is a logic one state. With a logic one state at the input to NAND gate 42, NAND gate 42 produces a voltage waveform at the output which is complementary to the input clock signal, PRECHARGE CLOCK. In response to the LOW VOLTAGE MODE PRECHARGE CLOCK, each P-channel precharge transistor switch, such as P-channel transistor switch 34, whose control gate is connected the LOW VOLTAGE MODE PRECHARGE CLOCK signal is activated. Since the P-channel transistor switches are each activated, the full power supply voltage is coupled to each precharge circuit node. For example, during the low voltage mode of operation, transistor switches 32 and 34 of data path precharge cell 28 are each activated. FIG. 5 illustrates the voltage level on precharge bus 30 in response to activated precharge switches during the low voltage mode of operation.

To summarize, data processing system 10 has both a normal and a low voltage mode of operation, which is programmable. The programmable voltage mode of operation is determined during the time period that the data processing system 10 is exiting a reset condition in response to a predetermined control signal external to data processing system 10. During the normal voltage mode of operation each precharge circuit node has a voltage swing of $V_{DD}-V_{tn}$, where $V_{DD}$ is typically five volts. During the low power mode of operation, the voltage swing is $V_{DD}$, which is typically three volts. The low voltage mode of operation reduces the operating power of data processing system 10 and also guarantees safe noise margins of logic circuits (not illustrated) coupled to each precharge circuit node.

It should be well understood that although a data processing system is discussed, any integrated circuit, such as a memory system, will benefit from a programmable voltage mode of operation. The illustrated power supply voltages of five and three volts are used to demonstrate the present invention, power supply voltages other than five and three volts may be implemented. For example, a reduced power supply voltage within the range of fifty percent to seventy-five percent of the maximum power supply voltage may be implemented, in addition to other supply voltage ranges. Further, the programmable voltage mode of operation is easily extended for use with electronic systems on printed circuit boards. Although a programmable voltage mode data processor is discussed which is responsive to a reset condition, other preconditions which utilize predetermined other data pads may be implemented. In addition, the programmable voltage mode of operation may be implemented via a predetermined software instruction. Further, the predetermined software instruction may be provided by a source either external or internal to the data processing system. For example, the predetermined software instruction may be incorporated within a memory, such as a read only memory (ROM), which is a part of the data processing system. Or the external source of the software instruction may be another hardware data processing system, such as a bus master, or a user of the data processing system.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system having a programmable mode for selecting operation at one of a plurality of power supply potentials, comprising:
   first control means for receiving control information from a source external to the data processing system, for storing said control information as a memory storage bit, and for providing an output at a logic state corresponding to the memory storage bit;
   second control means coupled to the first control means for receiving the output of the first control means, and for providing first and second selectively activated control signals in response thereto; and
   a pair of transistor switches coupled to the second control means, each transistor switch coupled to a precharge voltage node in the data processing system, each transistor switch having a control electrode for receiving a corresponding one of the selectively activated control signals, a first transistor of said pair of transistor switches establishing a first predetermined portion of a power supply voltage at the precharge voltage node in response to the first selectively activated control signal, a second transistor of said pair of transistor switches establishing a second predetermined portion of the power supply voltage at the precharge voltage node in response to the second selectively activated control signal;
   said second predetermined portion of said power supply voltage being different from said first predetermined portion of said power supply voltage.

2. The data processing system of claim 1 wherein the first control means comprises a latch for storing the selectively activated memory storage bit.

3. The data processing system of claim 1 wherein each of the the first and second selectively activated control signals has a logic high voltage substantially equal to the second predetermined portion of the power supply voltage, the second predetermined portion being less than the first predetermined portion.

4. The data processing system of claim 1 wherein the memory storage bit is selectively activated by a predetermined software instruction.

5. The data processing system of claim 1 wherein the second control means further comprise:
   a clock circuit for providing a precharge clock signal during a precharge period of the data processing system, the second selectively activated control signal equal to the precharge clock signal; and
   a NAND gate having a first input for receiving the precharge clock signal, a second input for receiving the output of the first control means, and an output for providing the first selectively activated control signal.

6. A data processing system having a programmable mode for selecting operation at one of a plurality of power supply potentials, comprising:
   storage means for receiving a mode bit from a source external to the data processing system, and for storing the mode bit therein;
   control means coupled to said storage means, for providing first and second control signals during a precharge period selectively in response to a value of the mode bit;
   a first transistor having a first current electrode coupled to a first power supply voltage terminal, a control electrode for receiving the first control signal, and a second current electrode coupled to a precharge line;
   a second transistor having a first current electrode coupled to the first power supply voltage terminal, a control electrode for receiving the second control signal, and a second current electrode coupled to the precharge line;
   said first transistor characterized as providing a first predetermined voltage drop between the first power supply voltage terminal and the precharge line; and
   said second transistor characterized as providing a second predetermined voltage drop different from the first predetermined voltage drop between the first power supply voltage terminal and the precharge line.

7. The data processing system of claim 6, wherein said second transistor is an N-channel MOS transistor.

8. The data processing system of claim 7, wherein said first transistor in a P-channel MOS transistor.

9. A method of operating a data processing system at different power supply potentials, comprising the steps of:
   receiving and storing a mode bit;
   precharging a precharge node to a first predetermined potential during a precharge period in response to the mode bit being in a first predetermined state, the first predetermined potential substantially equal to a voltage at a first power supply voltage terminal;
   precharging the precharge node to a second predetermined potential during the precharge period in response to the mode bit being in a second predetermined state, the second predetermined potential substantially equal to the voltage at the first power supply voltage terminal minus a predetermined voltage.

10. The method of claim 9, wherein said step of precharging the precharge node to the first predetermined potential comprises the steps of:
    coupling a source/drain path of a P-channel MOS transistor between the first power supply voltage terminal and the precharge node; and
    providing a logic low voltage to a gate of the P-channel MOS transistor in response to the mode bit being in the first predetermined state during the precharge period.

11. The method of claim 9, wherein said step of precharging the precharge node to the second predetermined potential comprises the steps of:
    coupling a source/drain path of an N-channel MOS transistor between the first power supply voltage terminal and the precharge node; and
    providing a logic high voltage to a gate of the N-channel MOS transistor during the precharge period.

12. The method of claim 11, wherein said step of providing the logic high voltage further comprises the step of providing the logic high voltage to the gate of the N-channel MOS transistor in response to the mode bit being in the second predetermined state during the precharge period.

* * * * *